(12) United States Patent
Mie et al.

(10) Patent No.: US 8,615,169 B2
(45) Date of Patent: Dec. 24, 2013

(54) PON SYSTEM AND REDUNDANCY METHOD

(75) Inventors: Kaori Mie, Tokyo (JP); Yoshifumi Hotta, Tokyo (JP); Seiji Kozaki, Tokyo (JP); Hiroaki Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 13/060,947

(22) PCT Filed: Aug. 26, 2008

(86) PCT No.: PCT/JP2008/065174
§ 371 (c)(1),
(2), (4) Date: Feb. 25, 2011

(87) PCT Pub. No.: WO2010/023721
PCT Pub. Date: Mar. 4, 2010

(65) Prior Publication Data
US 2011/0158638 A1  Jun. 30, 2011

(51) Int. Cl.
*H04J 14/00* (2006.01)

(52) U.S. Cl.
USPC ................................. 398/70; 398/66; 398/71

(58) Field of Classification Search
USPC .............................. 398/45–47, 57–61, 66–72
See application file for complete search history.

(56) References Cited

U.S. PATENT DOCUMENTS

| | | | |
|---|---|---|---|
| 5,539,564 A | 7/1996 | Kumozaki et al. | |
| 6,288,809 B1* | 9/2001 | Touma et al. | 398/9 |
| 6,868,232 B2* | 3/2005 | Park et al. | 398/5 |
| 2002/0027682 A1* | 3/2002 | Iwasaki et al. | 359/110 |
| 2003/0091015 A1 | 5/2003 | Gassho et al. | |
| 2007/0092256 A1* | 4/2007 | Nozue et al. | 398/72 |

FOREIGN PATENT DOCUMENTS

| | | |
|---|---|---|
| JP | 8-8820 A | 1/1996 |
| JP | 9 284325 | 10/1997 |
| JP | 10-126432 A | 5/1998 |
| JP | 1999 122172 | 4/1999 |
| JP | 2001 203639 | 7/2001 |
| JP | 2002 77212 | 3/2002 |
| JP | 2003-143156 | 5/2003 |
| JP | 2006 324796 | 11/2006 |
| JP | 2007-151195 | 6/2007 |

OTHER PUBLICATIONS

Japanese Office Action Issued Sep. 11, 2012 in Patent Application No. 2010-526443 (with partial English translation).

(Continued)

*Primary Examiner* — Dzung Tran
(74) *Attorney, Agent, or Firm* — Oblon, Spivak, McClelland, Maier & Neustadt, L.L.P.

(57) ABSTRACT

An optical line terminal performs transmission to optical network units using a light signal having a wavelength different for each of systems, allocates communication time to data, which is transmitted from the optical network units, in a time division manner for each of the systems, selects, for each of the optical network units, a system for performing data transmission, and transmits the data using a wavelength corresponding to the selected system. The optical network unit includes: ith blocking filter that removes a component other than a component in a predetermined wavelength band, which is set to correspond to an ith system, from a received light signal; and ith PON processing unit that applies termination processing to signals and transmitting the data based on an allocation result of the optical line terminal. The PON system includes n optical network units corresponding to $i=1$ to $i=n$.

20 Claims, 6 Drawing Sheets

(56) References Cited

OTHER PUBLICATIONS

Japanese Office Action issued Jan. 4, 2012, in Patent Application No. 2010-526443 (with Partial English-language translation).
International Search Report issued Oct. 7, 2008 in PCT/JP08/65174 filed Aug. 26, 2008.
Series G: Transmission Systems and Media, Digital Systems and Networks, Digital sections and digital line system-Optical line systems for local and access networks, A broadband optical access system with enhanced survivability, ITU-T Recommendation G.983. 5, (Jan. 2002).
U.S. Appl. No. 13/391,511, filed Feb. 21, 2012, Mukai, et al.
Chinese Office Action (with English translation) mailed on Mar. 29, 2013, in counterpart Chinese Appln No. 200880130869.0 (12 pages).

* cited by examiner

PON SYSTEM AND REDUNDANCY METHOD

TECHNICAL FIELD

The present invention relates to a PON (Passive Optical Network) system and a redundancy method in the PON system.

BACKGROUND ART

In the past, a GE-PON (Gigabit Ethernet (registered trademark) Passive Optical Network) system described in IEEE (Institute of Electrical and Electronics Engineers, Inc.) 802.3ah™ splits one optical fiber with a splitter, which is a passive element, and accommodates a plurality of ONUs (Optical Network Units) to thereby economically provide FTTH (Fiber To The Home) and FTTB (Fiber To The Building).

On the other hand, in the GE-PON system, it is likely that communication disconnection occurs in all the ONUs accommodated in the same splitter when a failure of a trunk line fiber occurs. There is also a problem in that a large number of service subscribers are affected. It is likely that this problem is allowed in the FTTH for which personal use is mainly performed at a relatively low service charge. However, in the FTTB that is a service for business, it is likely that data related to a mission critical task is transmitted and received. Therefore, it is requested that the communication disconnection does not occur even when a failure occurs. Therefore, an examination concerning PON protection for making a system redundant and switching the system when communication disconnection due to a failure occurs is performed.

As a PON protection system for B-PON (Broadband Passive Optical Network)/G-PON (Gigabit Passive Optical Network), in Non-Patent Literature 1 described below, a system (Type B) for duplexing a PON terminal end on an OLT (Optical Line Terminal) side and a trunk line fiber, and a system (Type C) for making a PON section completely redundant are recommended.

In Type B of the systems, optical interfaces are reduced to one by using a 2:N splitter and a section between the 2:N splitter and the OLT is made redundant. Type B is effective for failures such as a failure of an OLT interface and a trunk line fiber disconnection. In Type C, a redundant ONU including two 1:N splitters and two optical interfaces is necessary. Because the PON section is made completely redundant, Type C is effective for more kinds of failures such as a failure of the OLT interface, trunk line/branch line fiber disconnection, and an ONU interface failure.

A method of performing redundancy using an optical switch, always operating a currently-used system and a standby system, and reducing a switching time due to a failure is also proposed (see, for example, Patent Document 1 described below).

Patent Document 1: Japanese Patent Application Laid-open No. H9-284325

Non-Patent Literature 1: ITU-T, "A broadband optical access system with enhanced survivability", Recommendation G.983.5, 2002

DISCLOSURE OF INVENTION

Problem to be Solved by the Invention

However, of the PON protection systems in the past, in Type B of ITU-T G985.5 described in Non-Patent Literature 1, the same wavelength is used in downlink lines of both a working line (W side) used as a currently-used system and a protection line (P side) used as a standby system when a trunk line fiber or a W side OLT interface falls into a failure state. Therefore, when a #0 system is set as the working line, the other #1 system needs to be in a standby state. A control frame such as Ethernet (registered trademark) OAM (Operation Administration and Maintenance) cannot be transmitted to the #1 system. Therefore, there is a problem in that, when switching of a system due to failure occurrence is performed, it is impossible to determine before the switching whether the #1 system can normally operate and, regardless of the fact that the switching is carried out, it is likely that the system does not operate and communication disconnection occurs for a long time. In Type B, measures against failures in the branch line fiber and the ONU side interface are not taken. There is a problem in that Type B is insufficient for securing reliability for business.

On the other hand, in Type C of ITU-T G985.5 described in Patent Document 1, a system for making the PON section completely redundant is specified. However, in an actual operation, an ONU adapted to duplexing in which a PON terminal end is duplexed by having two interfaces of PON-LT (the #0 system) and PON-LT (the #1 system), and an ONU including one PON terminal end (PON-LT (the #0 system)) are mixed. Therefore, there is a problem in that, as the number of users who uses the ONU adapted to duplexing is smaller, a rate of use of the optical splitter of the #1 system is lower and the system cannot be effectively utilized. Further, there is a problem in that the ONU for business has a smaller number of set lines compared with the ONU for personal use, and cost is high in the ONU adapted to duplexing because a mass production effect cannot be expected.

In the technology described in Patent Document 1, redundancy is performed using the optical switch and the currently-used system and the standby system are always operated. Therefore, an apparatus on a user side needs to be an apparatus adapted to redundancy. There is a problem in that an existing facility cannot be used and cost is high.

The present invention has been made in view of the above and it is an object of the present invention to obtain a PON system and a redundancy method that suppress cost and realize high reliability.

Means for Solving Problem

A PON system according to an aspect of the present invention includes: an optical line terminal including n systems of termination processing units from a first system to an nth (a natural number equal to or larger than 2) system; a plurality of optical network units; and an optical splitter that splits a line for each of the systems of the optical line terminal into lines connected to the optical network units, wherein the optical line terminal performs transmission to the optical network units using a light signal having a wavelength different for each of the systems, and allocates communication time to data, which is transmitted from the optical network units, in a time division manner for each of the systems, selects, for each of the optical network units, a system for performing data transmission, and transmits the data using a light signal having a wavelength corresponding to the selected system, the optical network unit includes: ith blocking filter that removes a component other than a component in a predetermined wavelength band, which is set to correspond to an ith (a natural number from 1 to n) system, from a light signal received from the line split by the optical splitter and uses a result of the removal as an ith signal; and ith PON processing unit that applies termination processing to the ith signal and transmits the data in a communication time band allocated to the ith system based on an allocation result of the optical line terminal, and the PON system includes, as the optical network units, n optical network units corresponding to i=1 to i=n.

Effect of the Invention

In the PON system and the redundancy method according to the present invention, a subscriber home apparatus includes two or more systems of ONUs. In uplink communication, the same wavelength is allocated to all the systems and an A system and a B system are multiplexed in a TDMA scheme. In downlink communication, communication is performed at a different wavelength for each of the systems. Therefore, there is an effect that cost can be suppressed and high reliability can be realized.

EXPLANATIONS OF LETTERS OR NUMERALS 1, 7 OLT
2 ODN
3 Splitter
4 Optical fiber
5-1 to 5-N, 6-1 to 6-N Subscriber home apparatus
8, 9-1 to 9-N L2SW
11a, 71a A system PON-LT
11b, 71b B system PON-LT
51a A system ONU
51b B system ONU
52a, 52b ONU side PON processing unit
53a, 53b, 72a, 72b Blocking filter
73a, 73b OLT side PON processing unit
101 Uplink communication
102 A system downlink communication
103 B system downlink communication
104 A system uplink communication
105 B system uplink communication

BEST MODE(S) FOR CARRYING OUT THE INVENTION

Embodiments of a PON system and a redundancy method according to the present invention are explained in detail below with reference to the drawings. The present invention is not limited to the embodiments.

First Embodiment

Figure 1:
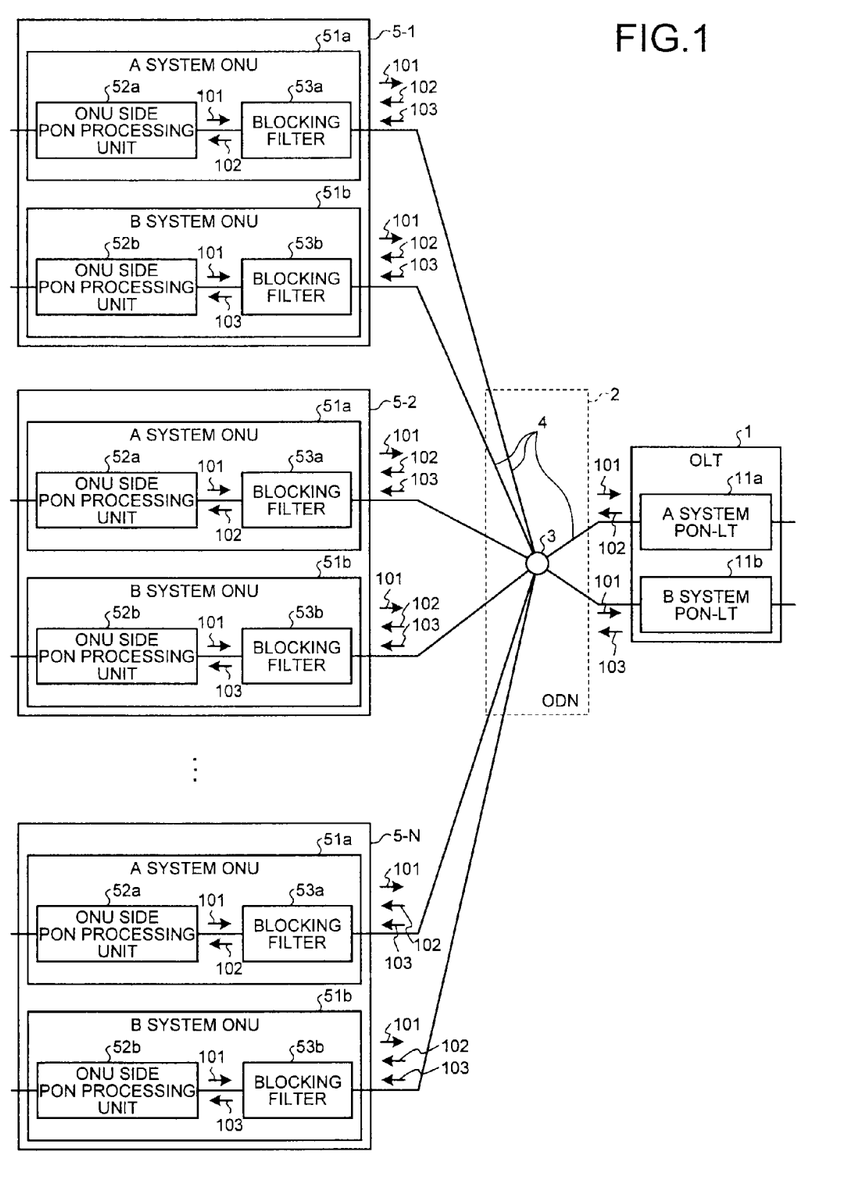
FIG. 1 is a diagram of a configuration example of a first embodiment of a PON system according to the present invention.

FIG. 1 is a diagram of a configuration example of a first embodiment of the PON system according to the present invention. As shown in FIG. 1, the PON system according to this embodiment includes an OLT 1, an ODN (Optical Distribution Network) 2, a splitter 3 which is a 2:M optical splitter and present in the ODN 2, subscriber home apparatuses 5-1 to 5-N set in the same subscriber home, and an optical fiber 4 that connects the OLT and the ODN and connects the subscriber home apparatuses 5-1 to 5-N and the ODN.

In this embodiment, a group of apparatuses having the same function are set in a home of a subscriber where redundancy is carried out, and the subscriber home apparatuses 5-2 to 5-N have a configuration same as that of the subscriber home apparatus 5-1. The subscriber home apparatus 5-1 includes two systems of ONUs; an A system ONU 51a and a B system ONU 51b. The A system ONU 51a includes an ONU side PON processing unit 52a that performs termination processing for user data, and a blocking filter 53a that blocks user data other than user data having a specific wavelength (a wavelength corresponding to the A system). The B system ONU 51b includes an ONU side PON processing unit 52b that performs termination processing for user data, and a blocking filter 53b that blocks user data other than user data having a specific wavelength (a wavelength corresponding to the B system).

The OLT 1 includes an A system PON-LT 11a, which is a PON-LT of the A system, and a B system PON-LT 11b, which is a PON-LT of the B system. In the PON system according to this embodiment, a direction of transmission from the subscriber home apparatuses 5-1 to 5-N to the OLT 1 is defined as an uplink direction and a direction of transmission from the OLT 1 to the subscriber home apparatuses 5-1 to 5-N is defined as a downlink direction. Uplink communication 101 in FIG. 1 indicates uplink communication performed using a wavelength λup. A system downlink communication 102 indicates downlink communication performed using a wavelength λ1. B system downlink communication 103 indicates downlink communication performed using a wavelength λ2.

In this embodiment, the A system ONU 51a and the B system ONU 51b are set in the same subscriber home in which duplexing is carried out. Therefore, as shown in FIG. 1, one splitter 3 is shared by the two systems; the A system and the B system.

Figure 2:
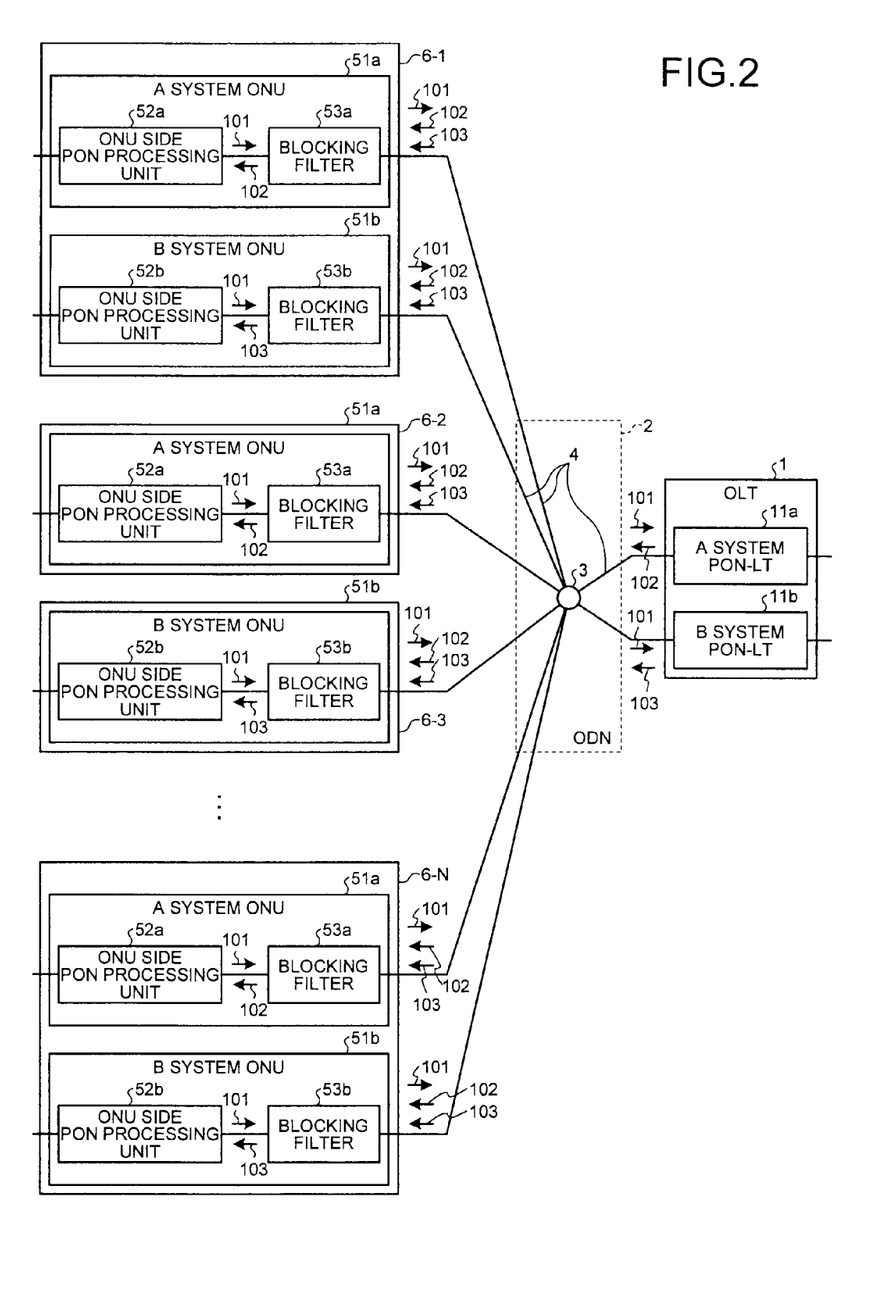
FIG. 2 is a diagram of a configuration example of the PON system in which subscribers who carry out duplexing and subscribers who do not carry out duplexing are mixed.

It is assumed that, in a home of a subscriber where duplexing is not carried out, one A system ONU 51a or one B system ONU 51b is set. FIG. 2 is a diagram of a configuration example of the PON system in which subscribers who carry out duplexing and subscribers who do not carry out duplexing are mixed. Among subscriber home apparatuses 6-1 to 6-N shown in FIG. 2, the subscriber home apparatuses 6-1 and 6-N are home apparatuses that carry out duplexing. The subscriber home apparatuses 6-1 and 6-N have a configuration same as that of the subscriber home apparatus 5-1 shown in FIG. 1. The subscriber home apparatus 6-2 and the subscriber home apparatus 6-3 are home apparatuses that do not carry out duplexing. The subscriber home apparatus 6-2 includes the A system ONU 51a and the subscriber home apparatus 6-3 includes the B system ONU 51b.

The operation in this embodiment is explained below. In this embodiment, in communication in the uplink direction, the same wavelength λup is allocated to all the ONUs. All the ONUs perform communication using this same wavelength λup irrespective whether the ONUs are the A system or the B system. For example, 1470 nanometers, which is a wavelength for a 10G-EPON, or 1310 nanometers, which is a wavelength for a GE-PON, is allocated as λup. As a multiplexing system in the uplink direction of the A system and the B system, a TDMA (Time Division Multiple Access) scheme is used. The OLT 1 performs allocation by the TDMA to secure lines of the A system and the B system by associating band allocation, which is performed by the A system PON-LT 11a and the B system PON-LT 11b, and allocation of time for the A system and the B system in the TDMA. The OLT 1 changes a band allocation ratio of a band allocated to the A system (allocation time) and a band allocated to the B system (allocation time) reflecting the number of (selected) ONUs (a system selection state of the ONUs) for each of the systems used for actual data communication. The ONU side PON processing unit 52a and the ONU side PON processing unit 52b respectively transmit data in communication times allocated to the systems corresponding to the ONU side PON processing unit 52a and the ONU side PON processing unit 52b.

In communication in the downlink direction, different two wavelengths λ1 and λ2 are respectively allocated to the A system and the B system. For example, a wavelength 1577 nanometers for the 10G-EPON is allocated to the A system and 1490 nanometers, which is a wavelength for a GE-PON, is allocated to the B system. The A system PON-LT 11a and the B system PON-LT 11b respectively transmit data using light signals having the wavelengths allocated to the systems corresponding to the A system PON-LT 11a and the B system PON-LT 11b. The data is transmitted using both the wavelengths of the A system and the B system to the subscriber home apparatuses 5-1 to 5-N (or 6-1 to 6-N) arranged on the subscriber side. Therefore, the subscriber home apparatuses include blocking filters 53a and 53b that block wavelength other than a specific wavelength. Further, the standby system ONU (the B system is the standby system) has a function of blocking a user frame to prevent the user frame from looping through a network.

In the case of a subscriber home apparatus adapted to duplexing, two systems are a currently-used system and a standby system. When both the currently-used system and the standby system are normal, the currently-used system is used for transmission and reception of data. The standby system is used only when a failure occurs in the currently-used system. When both the currently-used system and the standby system are normal, the standby system can be used for transmission and reception of data. However, in this case, the currently-used system ONU also has the function of blocking a user frame to prevent the user frame from looping through the network.

For example, the A system is set as the currently-used system. Usually, transmission of data is performed using the ONU of the A system (A system is selected). For example, when a failure occurs in the A system, the A system is switched to the B system (the B system is selected). In a home of a subscriber not adapted to duplexing, because one ONU adapted to only one of the A system and the B system is set, switching due to failure occurrence or the like is not carried out.

In this way, the uplink line is time-division multiplexed and different wavelengths are allocated to the downlink line in the A system and the B system. This makes it possible to adopt a hot standby system in which the A system and the B system are always in an operation state. It is possible to improve reliability of the PONs and accommodate extra traffic. By adopting such a hot standby system, it is possible to reduce switching time and always monitor both the A system and the B system. It is possible to prevent a situation in which the B system does not operate when a failure occurs and the A system is switched to the B system. Furthermore, a minimum unit for system switching can be set for each of logical channels by adopting the configuration explained in this embodiment.

Transmission speeds of the A system and the B system can be the same (100 Gbps for both the A system and the B system) or can be different (e.g., 100 Gbps for the A system and 1 Gbps for the B system). For example, when the transmission speeds of the A system and the B system are different and the A system is set to 10 Gbps transmission and the B system is set to 1 Gbps transmission, it is possible to use the GE-PON, which is the existing facility, for the B system and improve reliability at low cost. Specifically, when a subscriber who already subscribes for the GE-PON newly subscribes for a 10G-EPON system, the 10G-EPON system in which a fiber is laid anew is used as the A system and the existing GE-PON is left as a backup line. This makes it possible to effectively utilize the existing system.

When the present invention is applied to the 10G0-EPON, the GE-PON, or the like, as a management system for monitoring a state of a system, because both the systems are always in a communication possible state and an Ethernet® frame is transmitted and transferred, for example, an Ethernet® PS (Protection Switching), which is linear protection of Ethernet® described in ITU-T Recommendation G.8031 can be applied as switching protocol. Therefore, it is possible to flexibly configure a redundant system in units of logical channels using this function.

Figure 3:
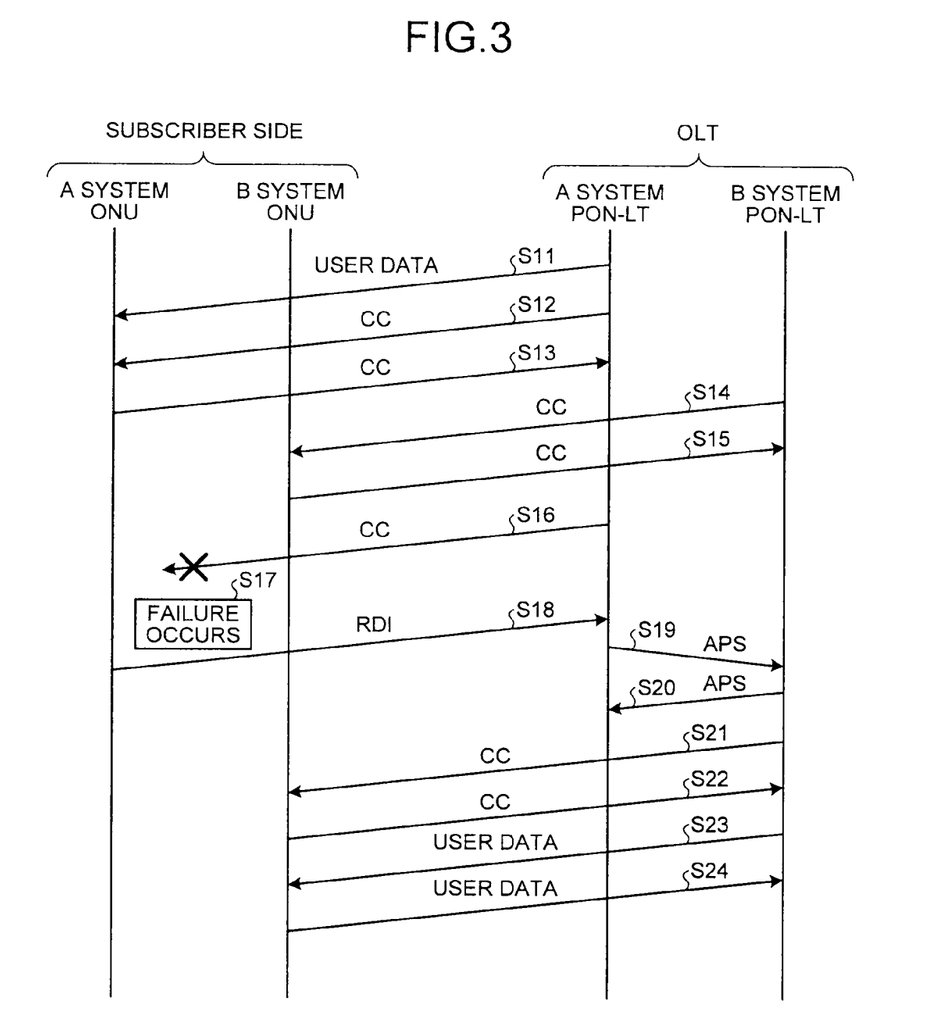
FIG. 3 is a diagram of an example of a switching sequence from an A system to a B system.

It is assumed that each of the ONUs also has a function of being termination of a frame to prevent a control frame from looping through a system (e.g., CC (Continuity Check) of an Ethernet® OAM). FIG. 3 is a diagram of an example of a switching sequence from the A system to the B system. In the example shown in FIG. 3, the CC is used as a control frame for checking normality of a system and failure occurrence is notified by RDI (Remote Detect Indication).

In the example explained below, a subscriber is adapted to duplexing and uses the subscriber home apparatus 5-1. In the subscriber home apparatus 5-1, the A system is selected and user data is received from the A system PON-LT 11a of the OLT 1 (step S11). The A system PON-LT 11a transmits CC, and the A system ONU 51a receives the CC (step S12). The A system ONU 51a returns the CC to the A system PON-LT 11a (step S13). The B system PON-LT 11b transmits CC and the B system ONU 51b receives the CC (step S14). The B system ONU 51b returns the CC to the B system PON-LT 11b (step S15).

The A system PON-LT 11a transmits CC (step S16). When a failure occurs (step S17), the A system ONU 51a returns RDI (step S18). When the A system PON-LT 11a receives the RDI from the A system ONU 51a, the A system PON-LT 11a transmits APS (Automatic Protection Switching) to the B system PON-LT 11b (step S19). When switching of a system can be carried out (e.g., when the B system PON-LT 11b receives the CC at step S14 to thereby confirm that the B system is normal), the B system PON-LT 11b returns the APS (step S20).

When the APS is returned, the OLT 1 carries out switching of a system. The B system PON-LT 1ib transmits CC and the B system ONU 51b receives the CC (step S21). The B system ONU 51b returns the CC to the B system PON-LT 11b (step S22). After the CC is returned, user data is transmitted from the B system PON-LT 11b to the B system ONU 51b (steps S23 and S24). The downlink communication is explained above. In the case of uplink communication, for example, operations in the opposite direction only have to be performed.

As explained above, in this embodiment, the subscriber home apparatus adapted to duplexing includes the two systems of ONUs; the A system ONU 51a and the B system ONU 51b. The ONUs are connected to the 2:M splitter 3 by the optical fiber 4. In the uplink communication, the same wavelength is allocated to the A system and the B system and the A system and the B system are multiplexed using the TDMA scheme. In the downlink communication, communication is performed at different wavelengths in the A system and the B system. Therefore, it is possible to always set the A system and the B system in the operation state, always perform, for both a system used for data transmission and a standby system, monitoring by a control frame such as Ethernet (registered trademark) OAM, and prevent a situation in which the standby system does not operate after switching of a system is carried out. Therefore, it is possible to utilize one optical splitter to the maximum and realize high reliability at low cost. In this embodiment, it is possible to accommodate an extra traffic. During stationary time when a failure does not occur, it is possible to expand usable band width.

In this embodiment, in the subscriber home apparatus adapted to duplexing, the user frame on the standby system side is blocked to prevent the user frame from looping through the system. Alternatively, the loop can be prevented by forcibly blocking communication (forced link down) concerning the ONU of the standby system (in the case of the example explained above, the ONU 51b) with some method.

In this embodiment, the systems are the two systems. However, the systems are not limited to this and can be three or more systems. In this case, a different wavelength only has to be allocated to the downlink communication for each of the systems to perform communication. Concerning the uplink communication, data of each of the systems only has to be multiplexed using the TDMA scheme.

Second Embodiment

Figure 4:
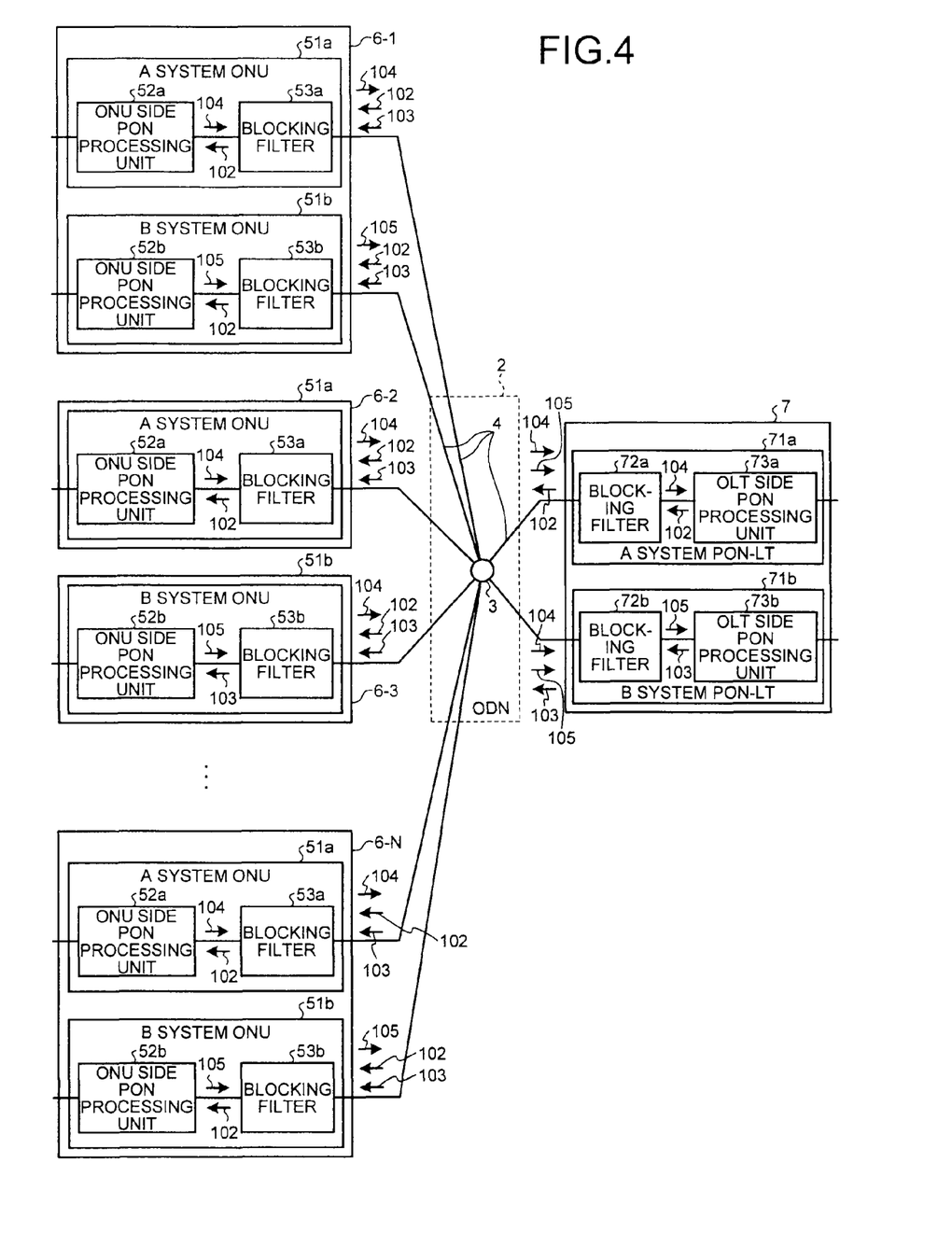
FIG. 4 is a diagram of a configuration example of a second embodiment of the PON system according to the present invention.

FIG. 4 is a diagram of a configuration example of a second embodiment of the PON system according to the present invention. The configuration of the PON system according to this embodiment is the same as that of the PON system according to the first embodiment except that the OLT 1 is replaced with an OLT 7. Components having functions same as those in the first embodiment are denoted by the same reference numerals and signs and explanation of the components is omitted.

The OLT 7 includes an A system PON-LT 71a and a B system PON-LT 71b. The A system PON-LT 71a includes a blocking filter 72a that blocks user data other than user data having a specific wavelength (a wavelength corresponding to the A system) and an OLT side PON processing unit 73a that performs termination processing for the user data. The B system PON-LT 71b includes a blocking filter 72b that blocks user data other than user data having a specific wavelength (a wavelength corresponding to the B system) and an OLT side PON processing unit 73b that performs termination processing for the user data.

A system uplink communication 104 shown in FIG. 4 indicates uplink communication of the A system performed using a wavelength λup1. Uplink communication 105 indicates uplink communication of the B system performed using a wavelength λup2. In the first embodiment, the same wavelength is used in both the A system and the B system in the uplink direction; however, in this embodiment, different wavelengths are used in the A system and the B system. For example, 1270 nanometers for the 10G-EPON is used for the A system and 1310 nanometers for the GE-PON is used for the B system. Data is transmitted in the same manner as the downlink communication in the first embodiment using the respective wavelengths. As in the first embodiment, in a PON-LT of a redundant system, a user frame on the standby system side is blocked to prevent the user frame from looping through a system. In this embodiment, because it is unnecessary to perform time division multiplexing for data of the A system and the B system, it is possible to increase a band in use in the uplink line as well.

As explained above, in this embodiment, the different wavelengths are allocated not only to the downlink communication but also to the uplink communication in the A system and the B system. Therefore, it is possible to realize the effect of the first embodiment and increase a usable bandwidth in the uplink line as well.

In this embodiment, the systems are the two systems; however, the systems are not limited to this and can be three or more systems. In such a case, a different wavelength simply has to be allocated to the downlink communication for each of the systems to perform communication. A different wavelength simply has to be allocated to the uplink communication as well for each of the systems.

Third Embodiment

Figure 5:
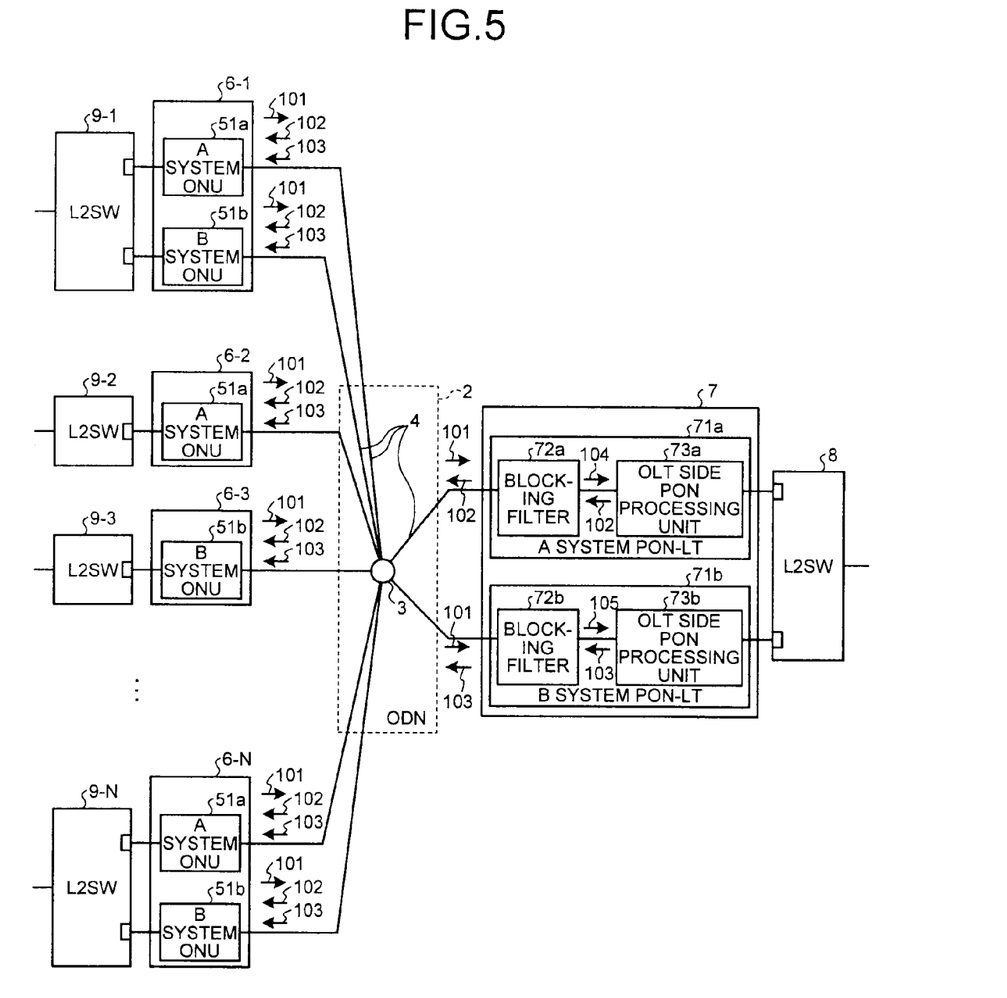
FIG. 5 is a diagram of a configuration example of a third embodiment of the PON system according to the present invention.

FIG. 5 is a diagram of a configuration example of a third embodiment of the PON system according to the present invention. The PON system according to this embodiment is the same as the PON system according to the first embodiment except that an L2SW (layer 2 switch) 8 connected to the OLT 1 and L2SWs 9-i connected to subscriber home apparatuses 6-i (i=1 to N) are added to the PON system explained with reference to FIG. 2 in the first embodiment. Components having functions same as those in the first embodiment are denoted by the same reference numerals and signs and explanation of the components is omitted.

In the first embodiment and the second embodiment, the control frame such as Ethernet (registered trademark) OAM is transmitted and received between the OLT 1 and the ONUs 5-1 to 5-N (or the ONUs 6-1 to 6-N). Alternatively, in this embodiment, an L2SW 8 on a higher level side is set as a terminal end of the control frame. An L2SW 7 according to this embodiment is connected to the A system PON-LT 11a and the B system PON-LT 11b. When the subscriber home apparatus 6-i is adapted to duplexing, the L2SW 9-i is connected to the A system and the B system. When the subscriber home apparatus 6-i is not adapted to duplexing, the L2SW 9-i is connected to either the ONU 51a or the ONU 51b that is in the subscriber home apparatus 6-i. Monitoring and failure detection performed between the OLT 1 and the ONUs 5-1 to 5-N (or the ONUs 6-1 to 6-N) are performed between the L2SW 8 and the L2SWs 9-i. Operations other than the above in this embodiment are the same as those in the first embodiment.

Figure 6:
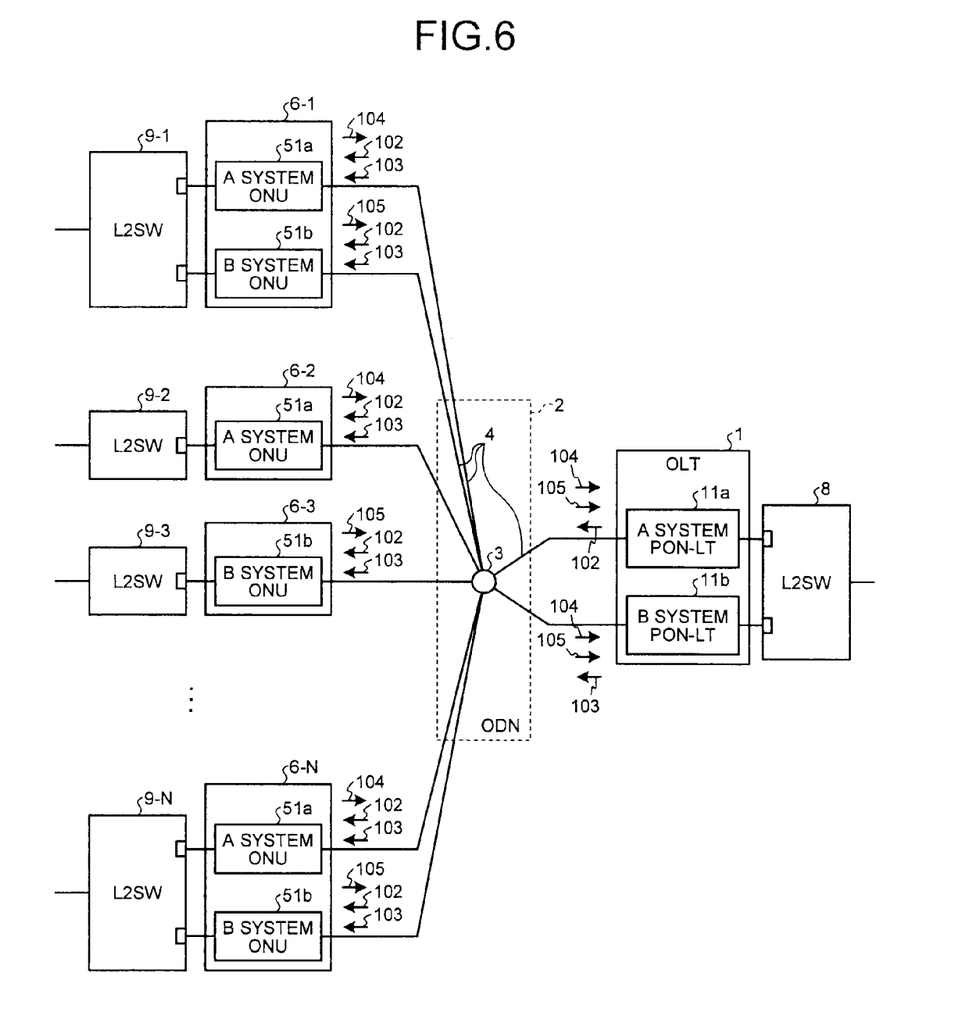
FIG. 6 is a diagram of a configuration example of the PON system in which different wavelengths are used in the A system and the B system.

In the example shown in FIG. 5, the same wavelength is used in the A system and the B system in the uplink communication. Alternatively, as in the second embodiment, different wavelengths (λup1 and λup2) can be used in the A system and the B system in the uplink communication. FIG. 6 is a diagram of a configuration example of the PON system in which different wavelengths are used in the A system and the B system. The configuration of the PON system of the example shown in FIG. 6 is the same as that in the second embodiment except that the L2SW 8 and the L2SWs 9-i are added. Operations are the same as those in the example shown in FIG. 5 except that different wavelengths are used in the A system and the B system.

As explained above, in this embodiment, the control frame for performing monitoring and the like of the A system and the B system is performed between the L2SW 8 and the L2SW 9-*i*. Therefore, it is possible to perform processing same as that in the second embodiment without increasing a load on the OLT 1.

Further, the L2SW 8 or the L2SWs 9-*i* can perform not only the transmission and reception of the control frame for performing monitoring and the like of the A system and the B system but also selection of the A system and the B system.

INDUSTRIAL APPLICABILITY

As explained above, the PON system and the redundancy method according to the present invention are useful for a PON system that carries out redundancy and is, in particular, suitable for a PON system that suppresses cost and realizes high reliability.

The invention claimed is:

1. A PON system comprising:
an optical line terminal including n sections of termination processing units from a first section to an nth (a natural number equal to or larger than 2) section;
m (m is a natural number) of subscriber home apparatuses; and
an n:M (M is a natural number greater than m) optical splitter that splits a line for each of the sections of the optical line terminal into lines connected to the subscriber home apparatuses, wherein
the optical line terminal performs transmission to optical network units using a light signal having a wavelength different for each of the sections, and
allocates communication time to data, which is transmitted from the optical network units, in a time division manner for each of the sections, selects, for each of the optical network units, a section for performing data transmission, and transmits the data using a light signal having a wavelength corresponding to the selected section,
at least part of the m subscriber home apparatuses include n of optical network units, each corresponding any one of i=1 to i=n,
ith optical network unit includes:
ith blocking filter that removes a component other than a component in a predetermined wavelength band, which is set to correspond to an ith (a natural number from 1 to n) section, from a light signal received from the line split by the optical splitter and uses a result of the removal as an ith signal; and
ith PON processing unit that applies termination processing to the ith signal and transmits the data in a communication time band allocated to the ith section based on an allocation result of the optical line terminal, and
the PON system is made redundant such that a number of lines between one of the optical splitter and the m of subscriber home apparatuses is larger than m.

2. The PON system according to claim 1, wherein the PON system sets logical channels between the optical line terminal and the optical network units and selects a section for each of the logical channels.

3. The PON system according to claim 1, wherein the optical line terminal determines, based on the number of the optical network units the sections of which are selected as the sections for performing data transmission, a ratio of the communication time to be allocated to each of the sections.

4. The PON system according to claim 3, wherein the PON system sets logical channels between the optical line terminal and the optical network units and selects a section for each of the logical channels.

5. The PON system according to claim 1, wherein the optical network unit corresponding to the section other than the selected section block a user frame.

6. The PON system according to claim 1, wherein the PON system blocks a line connected to the optical network unit corresponding to the section other than the selected section.

7. The PON system according to claim 1, wherein the PON system transmits and receives, for each of the sections, a control frame for checking normality of a transmission line between the optical line terminal and the optical network units.

8. The PON system according to claim 7, wherein, when the PON system determines based on a check result of the normality that a transmission line of the selected section is not normal, the PON system switches a section for transmitting data to a section other than the selected section.

9. The PON system according to claim 1, further comprising:
a first layer 2 switch connected to the optical line terminal; and
a second layer 2 switch connected to each of the optical network units, wherein
the PON system transmits and receives, for each of the sections, a control frame for checking normality of a transmission line between the first layer 2 switch and the second layer 2 switch.

10. The PON system according to claim 9, wherein, when the PON system determines based on a check result of the normality that a transmission line of the selected section is not normal, the PON system switches a section for transmitting data to a section other than the selected section.

11. A PON system comprising:
an optical line terminal including n sections of termination processing units from a first section to an nth (a natural number equal to or larger than 2) section;
m (m is a natural number) of subscriber home apparatuses; and
an n:M (M is a natural number greater than m) optical splitter that splits a line for each of the sections of the optical line terminal into lines connected to the subscriber home apparatuses, wherein
the optical line terminal includes:
ith blocking filters for optical line terminal that remove components other than components in predetermined wavelength bands, which are set to correspond to ith (a natural number from 1 to n) sections, from a light signal received from the line split by the optical splitter and use results of the removal as ith optical line terminal signals; and
ith PON processing units for optical line terminal that apply termination processing to the ith optical line terminal signals,
the optical line terminal performs transmission to optical network units using a light signal having a wavelength different for each of the sections, selects, for each of the optical network units, a section for performing data transmission, and transmits the data using a light signal having a wavelength corresponding to the selected section,
the optical network units perform transmission to the optical line terminal using a light signal having a wavelength different for each of the sections at least part of the m subscriber home apparatuses include n of optical network units, each corresponding any one of i=1 to i=n, ith optical network unit includes:

an ith blocking filter for optical network unit that removes a component other than a component in a predetermined wavelength band, which is set to correspond to an ith section, from a light signal received from the line split by the optical splitter and uses a result of the removal as an ith optical network unit signal; and ith PON processing unit for optical network unit that applies termination processing to the ith optical network unit signal, and the PON system is made redundant such that a number of lines between one of the optical splitter and the m of subscriber home apparatuses is larger than m.

12. The PON system according to claim 11, wherein the PON system sets logical channels between the optical line terminal and the optical network units and selects a section for each of the logical channels.

13. The PON system according to claim 11, wherein the optical network unit corresponding to the section other than the selected section block a user frame.

14. The PON system according to claim 11, wherein the PON system blocks a line connected to the optical network unit corresponding to the section other than the selected section.

15. The PON system according to claim 11, wherein the PON system transmits and receives, for each of the sections, a control frame for checking normality of a transmission line between the optical line terminal and the optical network units.

16. The PON system according to claim 15, wherein, when the PON system determines based on a check result of the normality that a transmission line of the selected section is not normal, the PON system switches a section for transmitting data to a section other than the selected section.

17. The PON system according to claim 11, further comprising:

a first layer 2 switch connected to the optical line terminal; and a second layer 2 switch connected to each of the optical network units, wherein the PON system transmits and receives, for each of the sections, a control frame for checking normality of a transmission line between the first layer 2 switch and the second layer 2 switch.

18. The PON system according to claim 17, wherein, when the PON system determines based on a check result of the normality that a transmission line of the selected section is not normal, the PON system switches a section for transmitting data to a section other than the selected section.

19. A redundancy method in a PON system including:

an optical line terminal including n sections of termination processing units from a first section to an nth (a natural number equal to or larger than 2) section; m (m is a natural number) of subscriber home apparatuses; and an n:M (M is a natural number greater than m) optical splitter that splits a line for each of the sections of the optical line terminal into lines connected to the subscriber home apparatuses, the optical line terminal performing transmission to optical network units using a light signal having a wavelength different for each of the sections, at least part of the m subscriber home apparatuses include n of optical network units, each corresponding any one of i=1 to i=n, the redundancy method comprising:

a data transmitting step in which the optical line terminal allocates communication time to data, which is transmitted from the optical network units, in a time division manner for each of the sections, selects, for each of the optical network units, a section for performing data transmission, and transmits the data using a light signal having a wavelength corresponding to the selected section;

a filtering step in which ith optical network units remove components other than components in predetermined wavelength bands, which are set to correspond to ith (a natural number from 1 to n) sections, from a light signal received from the line split by the optical splitter and use results of the removal as ith signals; and a PON processing step in which the ith optical network units apply termination processing to the ith signals and transmits the data in communication time bands allocated to the ith sections based on an allocation result of the optical line terminal, wherein the filtering step and the PON processing step corresponding to i=1 to i=n are executed, and the PON system is made redundant such that a number of lines between one of the optical splitter and the m of subscriber home apparatuses is larger than m.

20. A redundancy method in a PON system including:

an optical line terminal including n sections of termination processing units from a first section to an nth (a natural number equal to or larger than 2) section; m (m is a natural number) of subscriber home apparatuses; and an n:M (M is a natural number greater than m) optical splitter that splits a line for each of the sections of the optical line terminal into lines connected to the subscriber home apparatuses, the optical line terminal performing transmission to optical network units using a light signal having a wavelength different for each of the sections, at least part of the m subscriber home apparatuses include n of optical network units, each corresponding any one of i=1 to i=n, the redundancy method comprising:

a station side filtering step in which the optical line terminal removes a component other than a component in a predetermined wavelength band, which is set to correspond to an ith (a natural number from 1 to n) section, from a light signal received from the line split by the optical splitter and uses a result of the removal as an ith optical line terminal signal;

a station side PON processing step in which the optical line terminal applies termination processing to the ith optical line terminal signal;

a station side data transmitting step in which the optical line terminal selects, for each of the optical network units, a section for performing data transmission, transmits the data using a light signal having a wavelength corresponding to the selected section, and transmits the data using a light signal having a wavelength different for each of the sections;

a subscriber side filtering step in which ith optical network units remove components other than components in predetermined wavelength bands, which are set to correspond to ith sections, from a light signal received from the line split by the optical splitter and use results of the removal as ith optical network unit signals; and a subscriber side PON processing step in which the ith optical network units apply termination processing to the ith optical network unit signals, wherein the station side filtering step, the station side PON processing step, the subscriber side filtering step, and the subscriber side PON processing step corresponding to i=1 to i=n are executed, and the PON system is made redundant such that a number of lines between one of the optical splitter and the m of subscriber home apparatuses is larger than m.

* * * * *